US011126625B2

(12) United States Patent
Busjaeger et al.

(10) Patent No.: US 11,126,625 B2
(45) Date of Patent: Sep. 21, 2021

(54) CACHING TECHNIQUES FOR A DATABASE CHANGE STREAM

(71) Applicant: salesforce.com, inc., San Francisco, CA (US)

(72) Inventors: Benjamin Busjaeger, San Carlos, CA (US); Michael Sgroi, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 244 days.

(21) Appl. No.: 16/428,562

(22) Filed: May 31, 2019

(65) Prior Publication Data

US 2020/0380000 A1 Dec. 3, 2020

(51) Int. Cl.
*G06F 16/2455* (2019.01)
*G06F 16/22* (2019.01)
*G06F 16/23* (2019.01)

(52) U.S. Cl.
CPC .... *G06F 16/24552* (2019.01); *G06F 16/2282* (2019.01); *G06F 16/2358* (2019.01); *G06F 16/24568* (2019.01)

(58) Field of Classification Search
CPC ......... G06F 16/24552; G06F 16/24568; G06F 16/2282; G06F 16/2358
USPC ........................................................ 707/696
See application file for complete search history.

(56) References Cited

U.S. PATENT DOCUMENTS

| | | | |
|---|---|---|---|
| 9,940,360 B2 * | 4/2018 | Skrzypczak | ...... G06F 16/24568 |
| 9,946,593 B2 | 4/2018 | Bishop et al. | |
| 10,423,493 B1 * | 9/2019 | Vig | ..................... G06F 16/2322 |
| 10,853,182 B1 * | 12/2020 | Vig | ..................... G06F 16/1815 |
| 2010/0250497 A1 * | 9/2010 | Redlich | ............... H04L 63/0227 |
| | | | 707/661 |
| 2016/0203171 A1 | 7/2016 | Gangadharappa et al. | |

(Continued)

OTHER PUBLICATIONS

Das et al., "All Aboard the Databus!", Proceedings of the 3rd ACM Symposium on Cloud Computing, Oct. 14, 2012; XP55709751, pp. 1-14.

(Continued)

*Primary Examiner* — Dung K Chau
(74) *Attorney, Agent, or Firm* — Kowert, Hood, Munyon, Rankin & Goetzel, P.C.

(57) ABSTRACT

Techniques are disclosed relating to caching techniques for processing a database change stream. A caching module of a computer system may receive change records from a change stream that includes a plurality of records indicating changes to a database table. The change stream may include change records for multiple shards and is accessible by providing one or more position indicators for one or more of the multiple shards to request one or more change records and an updated position indicator. The caching module may store, for changes to a set of one or more shards for which the caching module is configured, one or more cache entries that each include a group of change records up to a threshold group size. A change processor module of the computer system may request a portion of the change stream by providing a received position indicator. The change processor module may receive, from the caching module, one or more cached change records from a cache entry that matches the provided position indicator.

20 Claims, 9 Drawing Sheets

(56) References Cited

U.S. PATENT DOCUMENTS

| | | |
|---|---|---|
| 2016/0292171 A1 | 10/2016 | Bhagat et al. |
| 2018/0081924 A1* | 3/2018 | Johnston ............. G06F 16/2365 |
| 2018/0129698 A1* | 5/2018 | Johnson ............ G06F 16/24568 |
| 2018/0139118 A1* | 5/2018 | Johnson ................ H04L 43/106 |
| 2018/0157699 A1 | 6/2018 | Sharma |
| 2019/0065542 A1 | 2/2019 | Baker et al. |
| 2019/0121901 A1 | 4/2019 | Ryan et al. |

OTHER PUBLICATIONS

International Search Report and Written Opinion in PCT Appl. No. PCT/US2020/031773 dated Jun. 30, 2020, 15 pages.

\* cited by examiner

CACHING TECHNIQUES FOR A DATABASE CHANGE STREAM

BACKGROUND

Technical Field

This disclosure relates generally to database systems, and, more specifically, to processing a change stream for a database table.

Description of the Related Art

Some database systems generate a stream of change records indicating changes to a database table. A change stream may be processed by multiple different applications and there may be timing constraints on processing change records. As the number of accesses to a change stream increases, performance may degrade in traditional implementations.

Figure 1:
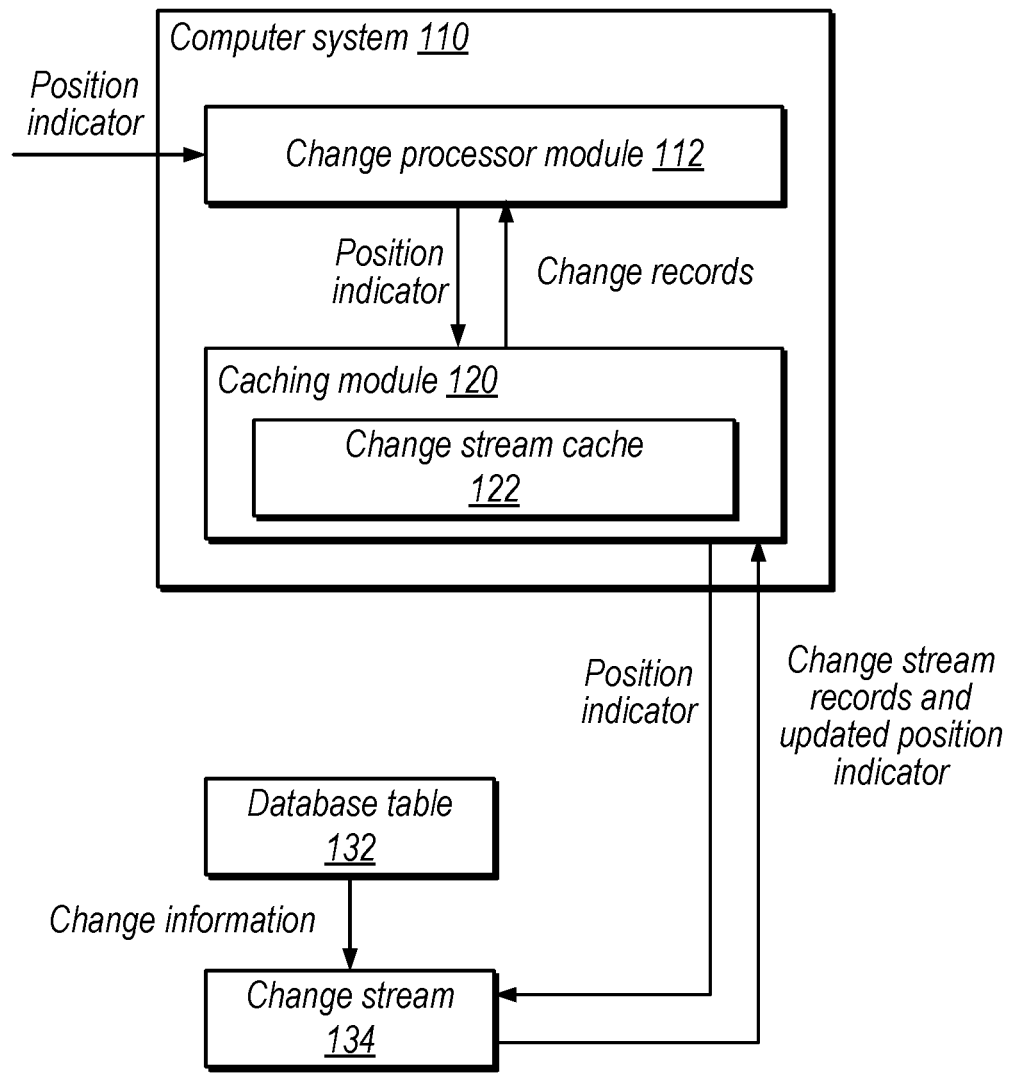
FIG. 1 is a block diagram illustrating an example database change stream processing system that includes a cache, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "caching module configured to cache change stream records" is intended to cover, for example, a computer system having, for example, a processor, network interface, memory having program instructions, etc. to performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example. When used herein, the term "or" is used as an inclusive or and not as an exclusive or. For example, the phrase "at least one of x, y, or z" means any one of x, y, and z, as well as any combination thereof (e.g., x and y, but not z or x, y, and z).

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In various high-volume database applications, multiple processes may access the same database table. In some embodiments, a change stream reflects a sequence of changes to the database table and may be accessed by one or more change processor modules to perform various tasks based on updates to the database table. As one example, a system may implement a web cluster and a stream cluster (e.g., that may each include one or more Java processes) that access a database system. Web processes may handle external change requests from users, while stream processes may handle internal updates. One example of an external change request is a user placing an item in their online shopping cart, while an example of an internal change is updating inventory details based on the item placed in the user's shopping cart.

In high-volume applications, performance and cost may be important design considerations. In some embodiments, a change stream cache is implemented to cache change records from the change stream that are associated with a particular process. For example, the change stream may be sharded and a process may be assigned to handle only a portion of the shards included in the change stream. This may advantageously improve performance in accessing change records and reduce the number of accesses to the change stream. The cache may group change stream records up to a threshold cache entry size (which may be referred to as a segment size) and perform caching operations at entry granularity. For example, data may be cached, evicted, hit/missed, etc. on a per-entry basis for groups of change records.

Different stream processes may implement different change stream caches and one or more change processor modules within a given stream process may share the cache for that process. Change processor modules may provide position indicators to access the change stream, and these position indicators may be used to detect cache hits and misses. A web process may forward a position indicator to a stream process, which the stream process may use to retrieve change stream records. In some embodiments, one or more processing layers implement multi-tenancy such that the database table stores entries for multiple tenants, although the underlying database system may be unaware of the multi-tenant implementation.

Stream processes may perform checkpointing for the change stream, where checkpoints may provide recovery locations when the system crashes. Checkpoints may be position indicators that specify a location within the change stream to begin processing records after a system crash. Checkpointing may be performed by one or more of the processing layers that implement multi-tenancy on a per-tenant basis and, based on individual tenant checkpoints, the system may generate an overall checkpoint for the change stream.

Overview of a Change Processing System

FIG. 1 is a block diagram illustrating an example database change stream processing system that includes a cache, according to some embodiments. In the illustrated embodiment, computer system 110 includes change processor module 112 and caching module 120, which are configured to process the change stream 134 for database table 132.

Database table 132, in the illustrated embodiment, provides change information to change stream 134. In some embodiments, the change information includes one or more change records indicating changes made to database table 132. In some embodiments, computer system 110 uses database table 132 to store data for multiple different tenants, although the database system may be unaware of multi-tenancy. In some embodiments, database table 132 may be included in a NoSQL database system, such as DynamoDB® or Google's Cloud Spanner, for example, and may horizontally partition data into shards stored on various different servers. In some embodiments, computer system 110 is configured to scale shards of a NoSQL database independently. In some embodiments, the scaling is based on a number of tenants or an amount of data for each tenant, for example.

Change stream 134, in the illustrated embodiment, stores change stream records that are accessible to computer system 110. In some embodiments, multiple different change streams provide change records to computer system 110. For example, multiple database tables may generate change information for multiple different change streams and a computer system may process the multiple different change streams. In some embodiments, a change stream includes information that specifies a sequence of changes made to a database table. In some embodiments, each change record has a corresponding sequence number, which may be unique across the change stream. In some embodiments, change records indicate the state of data both before and after a given change. A change stream may be provided by various database services, which may also provide polling mechanisms to retrieve changes from the change stream as they are generated. In some embodiments, a change stream is sharded and different processes handle different sets of change stream shards (the different sets may or may not overlap). In some embodiments, change stream shards are scaled based on changes made for one or more tenants or types of changes to be handled for a given change stream record. For example, a web process may receive a high load of external requests from a given tenant and may increase the size of a change stream shard for that tenant or may split the change stream shard into multiple shards based on the requests.

Caching module 120, in the illustrated embodiment, sends a position indicator to change stream 134 to request change records corresponding to the position indicator. In some embodiments, a polling module included in computer system 110 iteratively retrieves records from the change stream 134 using position indicators and passes these records to caching module 120. In the illustrated embodiment, caching module 120 receives change stream records and stores the change records in change stream cache 122. Note that accesses to the change stream 134 may also generate an updated position indicator, e.g., when polling the change stream, which may indicate the current most-recent record in the change stream. In some embodiments, change stream cache 122 stores changes for a set of one or more shards in cache entries that each include a group of change records up to a threshold group size. These groups are discussed in detail below with reference to FIGS. 4 and 5.

As used herein, the term "position indicator" refers to information that specifies a location within a change stream. In some embodiments, a position indicator is a sequence number that identifies a location within a shard of the change stream, where sequence numbers are unique within each shard in the change stream. In some embodiments, a position indicator includes a shard identifier (ID) and a sequence number for a record within the shard. Note that the combination of a shard identifier and sequence number may uniquely identify the location of a record within the change stream. In some embodiments, a position indicator is a delta link that includes one or more shard ID's with sequence numbers for the change stream included in a delta token of the delta link. The following is an example of a delta link used to begin querying the change stream, where the example query is an HTTP GET request:

http:// . . . delta?startOffset=ShardB+ShardC+ShardD

This example query requests sequence numbers for shards B, C, and D. The following is a non-limiting example of a second query using a delta link to get changes to a change stream that are subsequent to specified sequence numbers (e.g., sequence number 2 for shard B):

http:// . . . &$deltaToken=ShardB:2+ShardC:15+ShardD:8

This example query includes the sequence number "2" for shard B, "15" for shard C and "8" for shard D, where the sequence numbers indicate a location within each shard from which to begin retrieving change records. For example, records prior to the location within each shard specified by the sequence numbers may have already been processed. In some embodiments, a position indicator specifies to process records: after a sequence number, at a sequence number, at a given timestamp, most recently added to the change stream, etc., and, therefore, may be encoded using various different formats. Position indicators may advantageously reduce or remove the need to maintain or persist states for a change stream.

Change processor module 112, in the illustrated embodiment, receives a position indicator and sends the indicator to caching module 120 requesting change records. Caching module 120 returns change records to change processor module 112 from a cache entry of change stream cache 122 that matches the provided position indicator (or accesses the change stream 134 if there is a cache miss). Implementation details for change stream cache 122 are discussed in detail below with reference to FIG. 4. In some embodiments, implementing a change stream cache may advantageously support fan-out across multiple tenants. For example, multiple tenants may request the same or similar change stream records in parallel. In this example, the cache may reduce the number of requests or remove the need to access the change stream. Further, the cache may provide improved performance (e.g., reduced time between requesting a change stream record and receiving the requested record).

In some embodiments, computer system 110 implements multiple internal layers for processing a change stream for a database table (e.g., database table 132) that stores data for multiple different tenants. For example, computer system 110 may include one or more multi-tenant adapters that convert tenant-specific database operations (e.g., change operations) to a tenant-agnostic form. Tenant-agnostic database operations may be compatible with databases that are used to store information for multiple tenants but do not support multi-tenancy, for example.

As used herein, the term "multi-tenant database system" refers to those systems in which various elements of hardware and software of the database system are shared by one or more customers. For example, a computer system may simultaneously process requests for a great number of customers, and a database table may store rows for a potentially greater number of customers. In various embodiments, data for different tenants may be securely stored such that other tenants cannot access the data, absent permission.

Stream Process Overview

Figure 2:
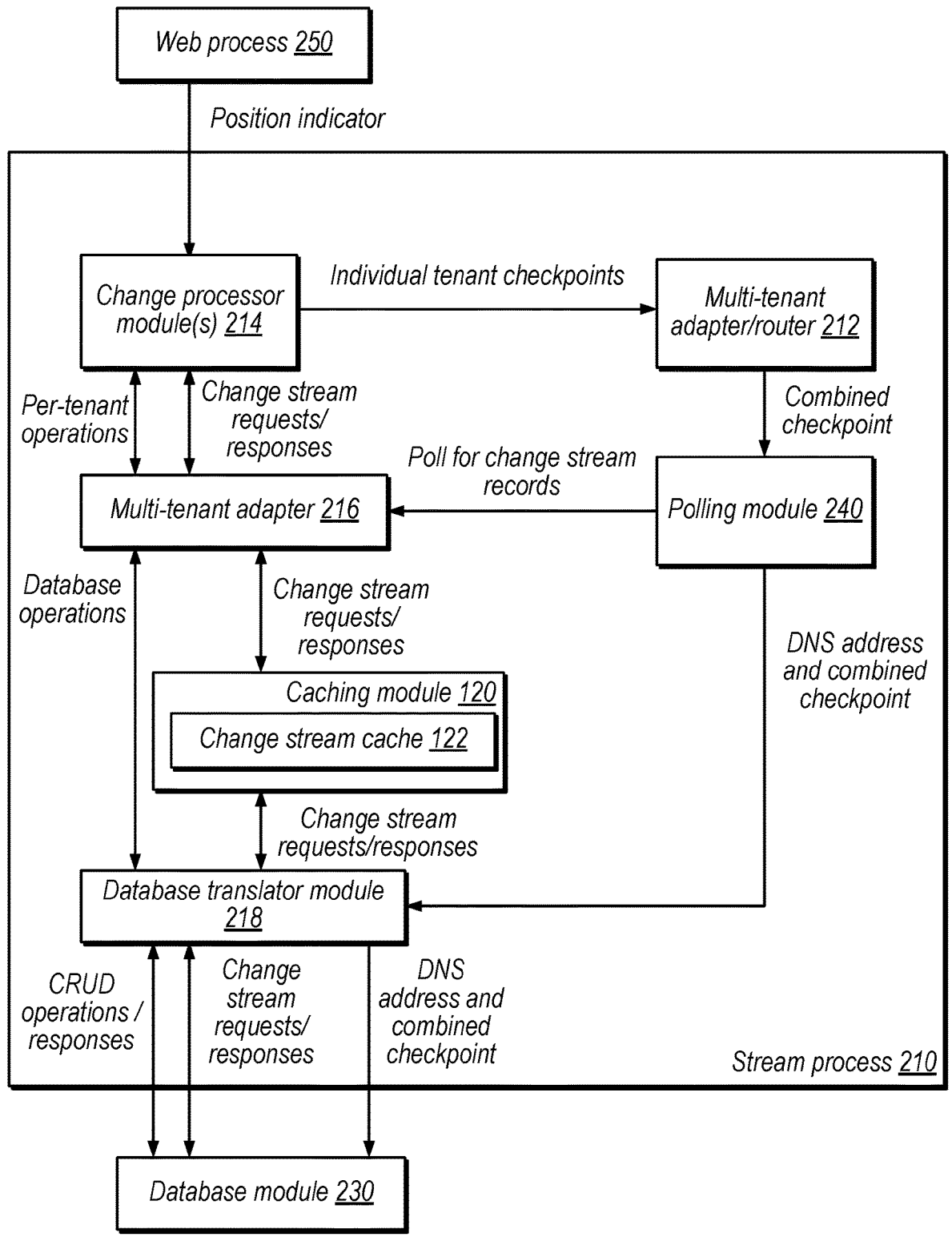
FIG. 2 is a block diagram illustrating example processing layers of a stream process that processes a change stream, according to some embodiments.

FIG. 2 is a block diagram illustrating example processing layers of a stream process that processes a change stream, according to some embodiments. In some embodiments, stream process 210 handles internal updates for a database table within database module 230. In some embodiments, stream process 210 receives position indicators from web process 250 that indicate specific changes to be retrieved (e.g., as requested by a client via web process 250). In some embodiments, handling these requests using stream process 210 may advantageously allow use of change stream cache 122, as discussed in further detail below.

In the illustrated embodiment, stream process 210 includes: multi-tenant adapter/router 212, change processor module(s) 214, multi-tenant adapter 216, database translator module 218, caching module 120, and polling module 240. Stream process 210 is one example of a process that may be implemented by the computer system 110 shown in FIG. 1.

Polling module 240 and caching module 120, in the illustrated embodiment, may retrieve and cache change stream records from database module 230 such that accesses to the change stream by change processor module(s) 214 hit the cached data, which may reduce accesses to database module 230. The remaining layers may translate requests, e.g., to support multi-tenancy and an underlying database implementation.

Polling module 240, in the illustrated embodiment, sends a domain name server (DNS) address for stream process 210 and a combined checkpoint for a change stream to database translator module 218. As change stream records are successfully processed, stream process 210 may update the combined checkpoint and store the combined checkpoint in a lease table (discussed in detail below with reference to FIG. 3). In some embodiments, polling module 240 retrieves the combined checkpoint from database module 230 (via database translator module 218) when the server system hosting stream process 210 recovers from a crash. For example, based on a sequence number indicated by the retrieved checkpoint, polling module 240 may begin processing change stream records after the location indicated by that sequence number. The DNS address may be accessed and used by other processes, e.g., to forward position indicators to stream process 210.

In some embodiments, polling module 240 polls for change stream records (e.g., from change stream 134) using delta links, where the delta links are position indicators with sequence numbers for one or more change stream shards. In some embodiments, polling module 240 sends an initial query to the change stream requesting sequence numbers for one or more shards. For each successive query, an updated position indicator is returned, with new sequence numbers for each change stream shard with new records. In some embodiments, all or a portion of the change stream records retrieved by polling module 240 are stored in change stream cache 122, as discussed in further detail below.

In some embodiments, stream process 210 instantiates change processor module(s) 214 and assigns one or more change stream shards to each change processor module. Note that stream process 210 may assign change stream shards to previously-instantiated change processor module(s) 214. In some embodiments, at least one change processor module 214 is instantiated for each change stream shard to be processed by stream process 210.

As used herein, the term "process" is intended to be construed according to its well-understood meaning, which includes program code and execution state for an instance of a computer program. In some embodiments, a process is an application container such as a Docker® container. In some embodiments, the size and number of containers used for stream processing may be adjusted based on processing requirements. As discussed above, different types of processes (e.g., web or stream) may be used to handle different types of changes for a database system. Non-limiting examples of processes include: Docker® containers, Heroku® dynos, and Java processes.

Multi-tenant adapter/router 212, in the illustrated embodiment, receives individual tenant checkpoints received from change processor module(s) 214 to a tenant-agnostic form and generates a combined checkpoint based on the individual checkpoints, as discussed in detail below with reference to FIG. 7. As used herein, the term "checkpoint" is intended to be construed according to its well-understood meaning, which includes a recovery point. Thus, a checkpoint may imply that earlier activity has been successfully processed such that it does not need to be re-processed after a system failure or other error condition. Thus, a checkpoint may provide stateful information for a change stream, allowing the system to return to this state if it experiences failures. In some embodiments, an overall or cumulative checkpoint is generated for the change stream based on individual tenant checkpoints. A change processor module 214 may generate one or more individual tenant checkpoints for one or more assigned shards.

Caching module 120, in some embodiments, receives change stream requests that include position indicators (e.g., delta links) from multi-tenant adapter 216 (where the change stream requests may originate from a change processor module 214 or polling module 240). In response to receiving a change stream request, caching module 120 determines whether the corresponding change stream records are cached in change stream cache 122 and provides the records from cache 122 if so. If the records are not cached, caching module 120 may forward the change stream request to database translator module 218 to retrieve the records from the change stream (and may cache the records once they are returned).

Database translator module 218, in the illustrated embodiment, converts database requests (e.g., database operations or change stream requests) to a format recognized by database module 230. In some embodiments, database translator module 218 implements an application programming interface (API) associated with database module 230. In some embodiments, database translator module 218 is associated with a software development kit (SDK) configured to communicate with database module 230.

Change processor module(s) 214, in the illustrated embodiment, are configured to send both requests associated with a database table and requests for a change stream of database module 230. For database table operations, a change processor module 214 sends a request for one or more per-tenant operations to database module 230 via multi-tenant adapter 216 and database translator module 218. For change stream requests, a change processor module 214 sends requests to multi-tenant adapter 216 and change records are retrieved from change stream cache 122 or database module 230.

In the illustrated embodiment, a change processor module 214 receives one or more position indicators from web process 250. In some embodiments, web process 250 sends the position indicators based on the DNS address of stream process 210 (e.g., by retrieving the DNS address stored in the database module 230 by polling module 240). In the illustrated embodiment, a change processor module 214 sends a request for one or more per-tenant operations to database module 230 via multi-tenant adapter 216 and database translator module 218. Stream process 210 may return retrieved change records to web process 250. In some embodiments, a change processor module 214 sends a per-tenant operation to the database table based on one or more retrieved change records. For example, a change processor module 214 may access the database to update shopping cart information for a user of a particular tenant, based on receiving a change record indicating that the user has requested to add an item to a shopping cart.

Multi-tenant adapter 216, in the illustrated embodiment, converts per-tenant operations to database operations supported by database module 230 (e.g., tenant agnostic CRUD operations). Multi-tenant adapter 216 also forwards requests from polling module 240 to caching module 120 (note that adapter 216 may not actually perform any operations on these requests). In some embodiments, multi-tenant adapter 216 is configured to translate tenant-based addressing information into locations in database table 132.

Database translator module 218, in the illustrated embodiment, handles data from various other modules and adapters within stream process 210 and communicates this information in a form that is supported by database module 230. Specifically, in the illustrated embodiment, database translator module 218 sends database operations and change stream requests to database module 230 and receives change stream responses. In the illustrated embodiment, database translator module 218 also sends the DNS and combined checkpoint (e.g., storing this information in a lease table).

Database module 230, in some embodiments, performs operations using a database table based on the CRUD operations and stores the DNS address and checkpoint in a lease table based on the information received from database translator module 218. In the illustrated embodiment, database module 230 also sends change stream records, e.g., retrieved from a change stream based on a supplied delta link, to module 218.

Example Change Processing System

Figure 3:
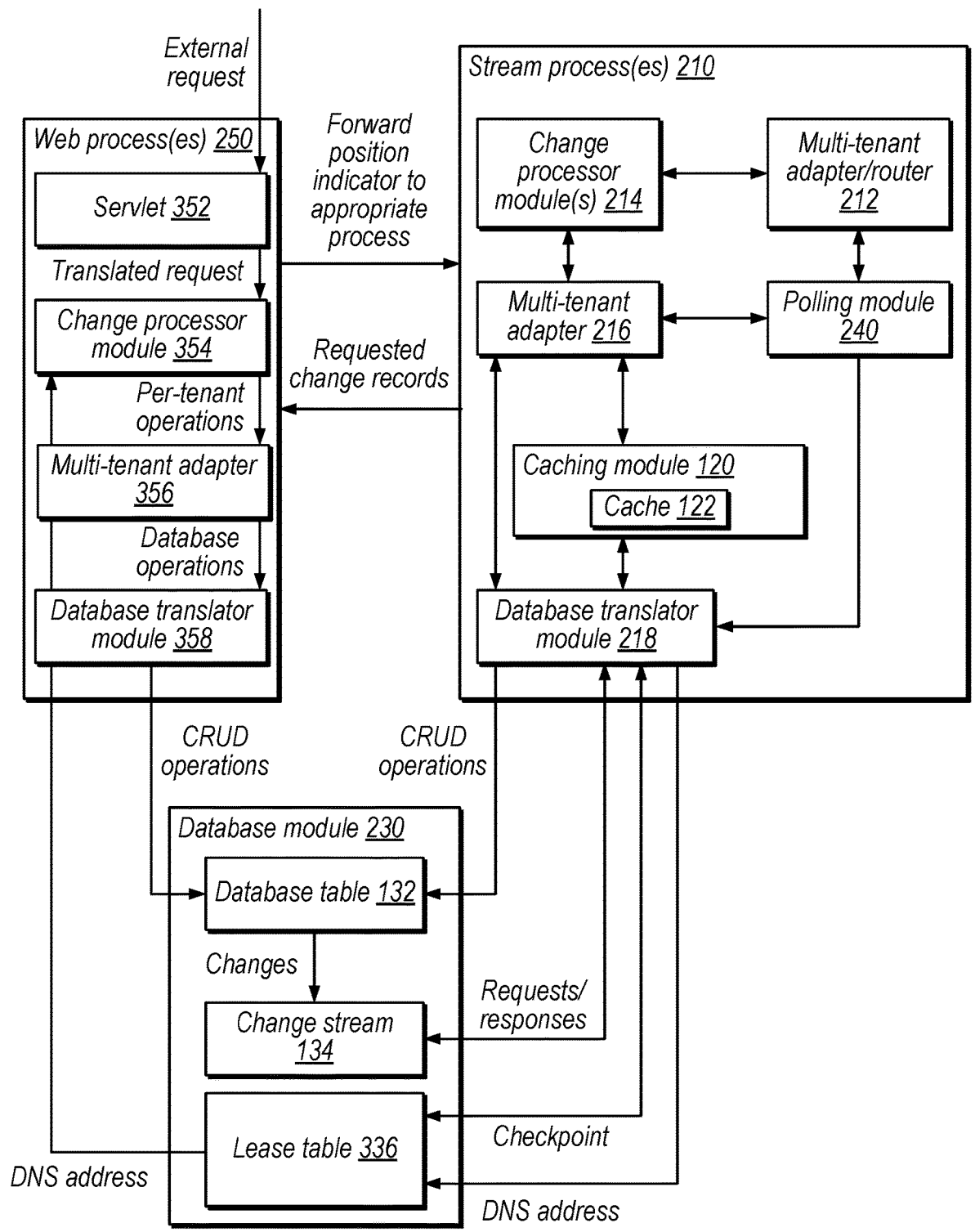
FIG. 3 is a block diagram illustrating example interactions between a web process and a stream process, according to some embodiments.

FIG. 3 is a block diagram illustrating example interactions between a web process and a stream process, according to some embodiments. In the illustrated embodiment, one or more web process(es) 250 handle external requests to perform one or more database operations and one or more stream process(es) 210 handle one or more database operations. Database module 230, in the illustrated embodiment, includes database table 132, change stream 134, and lease table 336.

A web process 250, in some embodiments, receives one or more external requests (e.g., via a network such as the internet) from one or more computing devices. In some embodiments, external requests cause changes to the database table 132. For example, a user may add an item to their online shopping cart and the server hosting the user's device may send a hypertext transfer protocol (HTTP) POST request to a web process 250. In the illustrated embodiment, servlet 352 receives the external request, translates the request, and sends the translated request to change processor module 354. For example, a servlet may be a Java servlet that translates HTTP requests to Java data. In the illustrated embodiment, change processor module 354 generates one or more per-tenant operations for database table 132 and sends these operations to multi-tenant adapter 356, which converts them to database operations supported by database module 230. In some embodiments, a given web process includes one or more change processors. For example, the number of change processors may be determined based on the number of external requests. Multi-tenant adapter 356 sends database operations to database translator module 358 which generates one or more CRUD operations for database table 132. For example, database translator module 358 may be associated with a software development kit (SDK) configured to communicate with database module 230.

Database module 230, in the illustrated embodiment, receives CRUD operations forwarded from a database translator module 358 included in one of web process(es) 250 and implements one or more changes to database table 132. In the illustrated embodiment, changes to database table 132 are indicated by change stream 134. In some embodiments, change stream 134 is sharded, where each shard includes one or more change records. In some embodiments, an external request includes a delta link, which a web process 250 forwards to a stream process 210, which retrieves the corresponding change record from cache 122, if available, and responds with requested change records to web process 250 (which may in turn provide the records to the requesting client).

Lease table 336, in the illustrated embodiment, stores one or more DNS addresses for one or more stream process(es) 210 and a mapping of a DNS address to a set of one or more change stream shards. Web process 250 retrieves a DNS address from the lease table 336 to determine a stream process to which to forward the position indicator (e.g., which stream process is responsible for processing which change stream shards). The web process 250 then uses the DNS address to forward a position indicator for a particular change to an appropriate stream process 210. In some embodiments, lease table 336 stores stateful information for one or more shards of a change stream, e.g., each row of the lease table may represent a shard that is being processed by a given stream process, where the row includes a shard identifier, a checkpoint, and a lease ID. Lease information may be used by polling modules of different stream processes, for example, to perform load balancing between the processes. The checkpoint for each shard may be a sequence number identifying the most recently processed record for that shard.

Stream process 210, in the illustrated embodiment, receives a forwarded position indicator from web process 250 and provides the position indicator to one or more change processor modules 214 associated with the one or more shards specified by the position indicator. For example, the position indicator may be a delta link that includes sequence numbers for one or more change stream shards, where change processor module(s) 214 were previously assigned to handle those shards. Note that the internal layers (e.g., 212, 214, 218, 120, and 240) of stream process(es) 210 may perform operations similar to those described in detail above with reference to FIG. 2. In some embodiments, the forwarded position indicator may facilitate use of cache 122, e.g., if polling module 240 has already retrieved a corresponding change record such that the record is cached. In some embodiments, the stream process 210 returns requested change records to the web process 250 and the web process 250 then sends the records to the computing device that sent the external change request. Handling change stream requests to a web process 250 using a stream process 210 may advantageously allow for use of cache 122, in various embodiments.

Database translator module 218, in the illustrated embodiment, sends CRUD operations for database table 132 to database module 230. In some embodiments, the CRUD operations are sent based on one or more internal updates for database table 132 (e.g., inventory count updates). Database translator module 218 sends a checkpoint and a DNS address from stream process 210 to database module 230, which stores this information in lease table 336. In some embodiments, module 218 retrieves the most recent checkpoint after recovering from a system crash, for example.

As one example, the system shown in FIG. 3 may process a request from a user of a given tenant, to add an item to their online shopping cart. Web process 250, in this example, receives the request from the user and generates a CRUD operation for database table 132 to add shopping cart information to the database table for the user. Further in this example, the shopping cart information added to database table 132 may be reflected in change stream 134. Database module 230 may send a DNS address from lease table 336 for a given stream process 210 and a position indicator from change stream 134 to web process 250, where the position indicator specifies a sequence number in shard A of the change stream for change records that reflect the shopping cart information being added to database table 132. In this example, the web process 250 forwards the position indicator to the given stream process 210 based on the DNS address from lease table 336.

Continuing with this example, a change processor module 214 of the stream process 210 configured to handle shard A sends a request for change records for shard A to caching module 120 using the forwarded position indicator and receives the change records for shard A from a cache entry matching the position indicator. Finally, in this example, based on the received change records, change processor module 214 sends a command to database module 230, where the command includes instructions for updating inventory counts and to generate a new user interface configured to display the user's online shopping cart based on the user placing an item in their online shopping cart.

Example Cache Implementation

Figure 4:
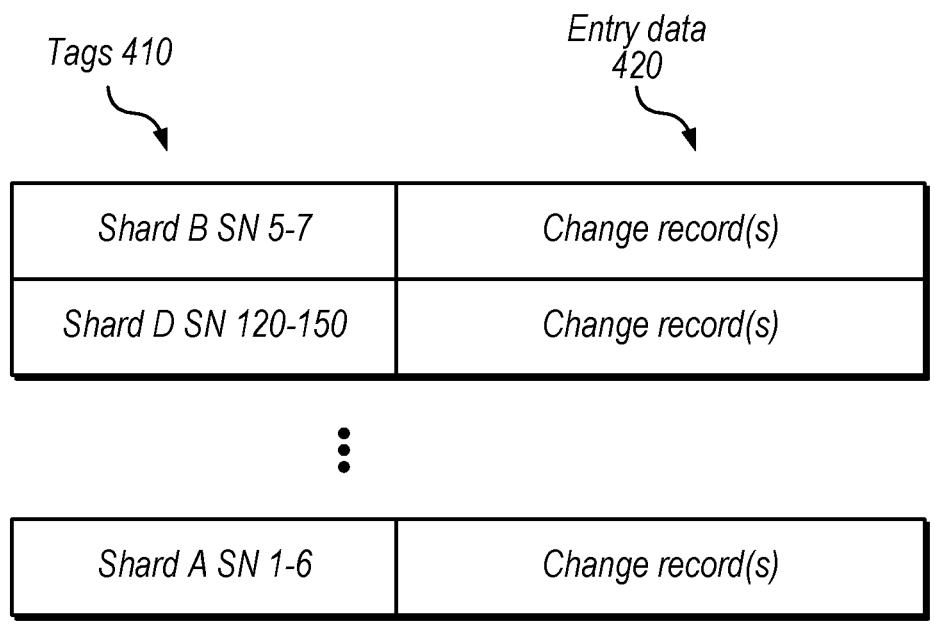
FIG. 4 is a block diagram illustrating an example cache implementation, according to some embodiments.

FIG. 4 is a block diagram illustrating an example cache implementation, according to some embodiments. In the illustrated embodiment, the cache includes tags 410 for different entry data 420.

Each cache entry, in the illustrated embodiment, includes a tag 410 that specifies a shard identifier and corresponding sequence numbers for change records stored in that entry. In the illustrated embodiment, the tag 410 for the first entry includes sequence numbers 5-7 for shard B. Similarly, the tag 410 for the second cache entry specifies that the second cache entry includes change records corresponding to sequence numbers 120-150 for shard D. The final cache entry, in the illustrated embodiment has a tag 410 that specifies that records corresponding to sequence numbers 1-6 for shard A are stored in the cache entry. In some embodiments, the cache may store records from multiple streams and, therefore, the tag 410 of each cache entry includes a stream identifier in addition to a shard identifier and sequence numbers.

In some embodiments, a change processing module 214 provides a position indicator and the caching module 120 detects a cache hit or miss and provides change records that match the position indicator if there is a cache hit. Caching module 120 may retrieve records from change stream 134 if there is a cache miss. In some embodiments, caching module 120 adds retrieved change records to a cache entry until a threshold entry size is met as discussed in detail below with reference to FIG. 5. Consider an example position indicator that specifies shard B and the sequence number 6. In this example, the position indicator produces a cache hit for the first cache entry and the cache returns one or more change records after the sequence number 6 (in some embodiments, the cache returns all sequence numbers in an entry that follow a provided position indicator).

In some embodiments, a cache executes cache operations on a group level (e.g., segment level) and continues to add change records to a group of change records in an entry until the entry is full. Thus, caching module 120 may detect hits and misses and perform evictions on entries that are full or partially full of change records. Cache 122 may be implemented using any of various types of caching techniques and may perform evictions using various control techniques such as least recently used (LRU) or first-in-first-out (FIFO), for example. In some embodiments, cache 122 is a software cache.

Figure 5:
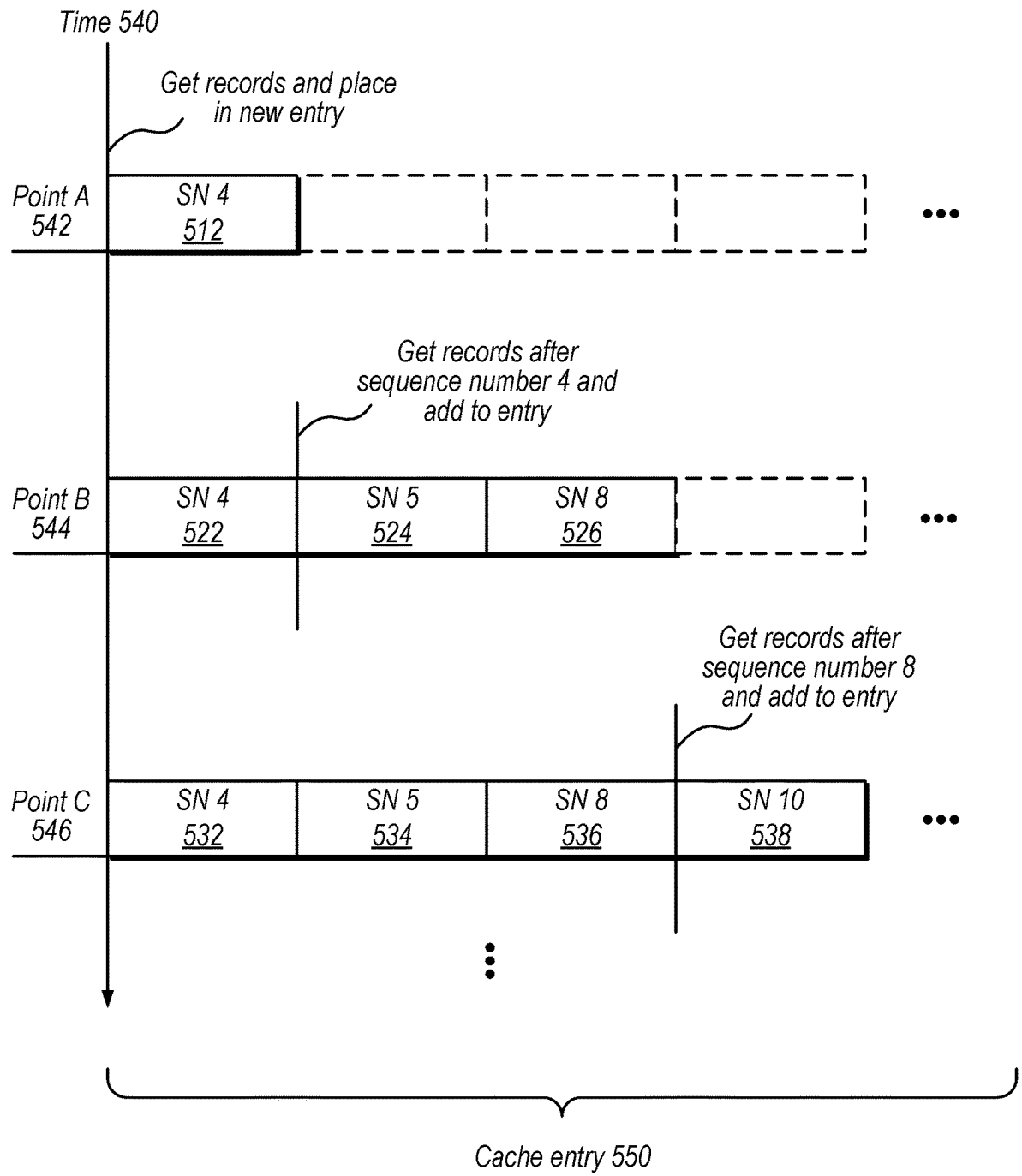
FIG. 5 is a block diagram illustrating example additions to a cache entry as change records are retrieved, according to some embodiments.

FIG. 5 is a block diagram illustrating example additions to a cache entry as change records are retrieved, according to some embodiments. In the illustrated embodiment, contents of cache entry 550 are shown at points A-C 542-546, where different change stream records 512-538 with different sequence numbers are added to cache entry 550 at the different points.

At point A 542, in the illustrated example, a process retrieves a change record 512 with sequence number 4 from change stream (e.g., change stream 134) and adds it to a newly-allocated cache entry 550. In some embodiments, the change record is retrieved from a change stream based on a request with a delta link from polling module 240 or a change processor module 214. Note that after this retrieval, the database system may provide an updated delta link to the requester that specifies sequence number 4 and the shard identifier for cache entry 550. In some embodiments, change record 512 is added to a new cache entry because a cache entry in which records were previously being aggregated is full.

At point B 544, in the illustrated example, a process retrieves records 524 and 526 with sequence numbers 5 and 8 from the change stream and adds them to cache entry 550 (already containing record 522). Note that records 524 and 526 may have been added to the change stream subsequent to the retrieval of record 512, e.g., when retrieved by polling the change stream. In some embodiments, the database system returns an updated delta link with sequence number 8 and a shard identifier. At point C 546, in the illustrated example, the cache retrieves a change record 538 with sequence number 10 from the change stream and adds it to cache entry 550, which already contains records 532-536. In some embodiments, the database system then sends an updated delta link with sequence number 10 and a shard identifier. This process may continue until a threshold entry size is reached. For example, the threshold entry size may be 50, 200, 1000, or 5000 records or any other appropriate size. In some embodiments, once a threshold entry size is reached, caching module 120 allocates a new entry for caching records retrieved from a change stream.

Figure 6:
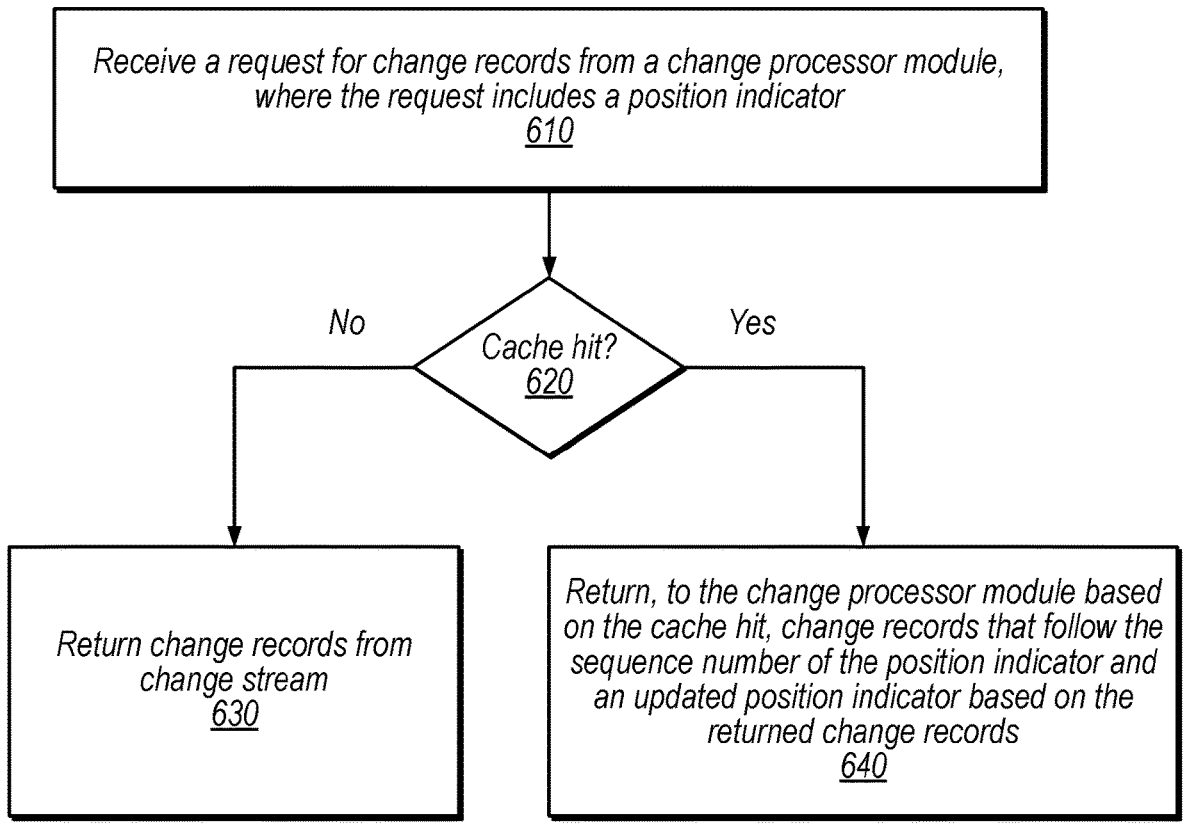
FIG. 6 is a flow diagram illustrating an example method for using a cache for a change stream, according to some embodiments.

FIG. 6 is a flow diagram illustrating an example method for using a cache for a change stream, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, a cache receives a request for change records from a change processor module, where the request includes a position indicator. In some embodiments, the cache receives multiple requests in parallel from different change processor modules. In some embodiments, two different change processor modules submit requests where the position indicators for the requests are similar (indicate a similar location in the cache). In some embodiments, to benefit from cache locality, the cache may align change processor modules to entry boundaries to allow for the different modules to retrieve records from the cache in lock step over time.

At 620 the cache determines whether the supplied position indicator produced a cache hit. For example, the cache may attempt to locate an entry corresponding to a shard ID and a sequence number included in the position indicator. In some embodiments, the entry includes a tag with a shard ID and one or more sequence numbers for the shard ID, as discussed in detail above with reference to FIG. 4. If there is a cache hit at element 620, the flow proceeds to element 640. If there is a cache miss, the flow proceeds to element 630.

At 630 the caching module returns records from the change stream. The caching module may cache the returned records in an available cache entry for future requests. The caching module may also forward an updated position indicator based on the returned change records.

At 640 the caching module returns, to the change processor module based on the cache hit, cached change records that follow the sequence number of the position indicator and an updated position indicator based on the returned change records. The caching module may generate the updated position indicator in the event of a cache hit, as opposed to receiving an updated position indicator from the database system for cache misses. As one example, the updated position indicator may include one or more of the same shard IDs as the original position indicator, but different sequence numbers for the one or more shards. In this example, the sequence numbers may be the sequence numbers of the last record in each shard returned to the change processor module.

Figure 7:
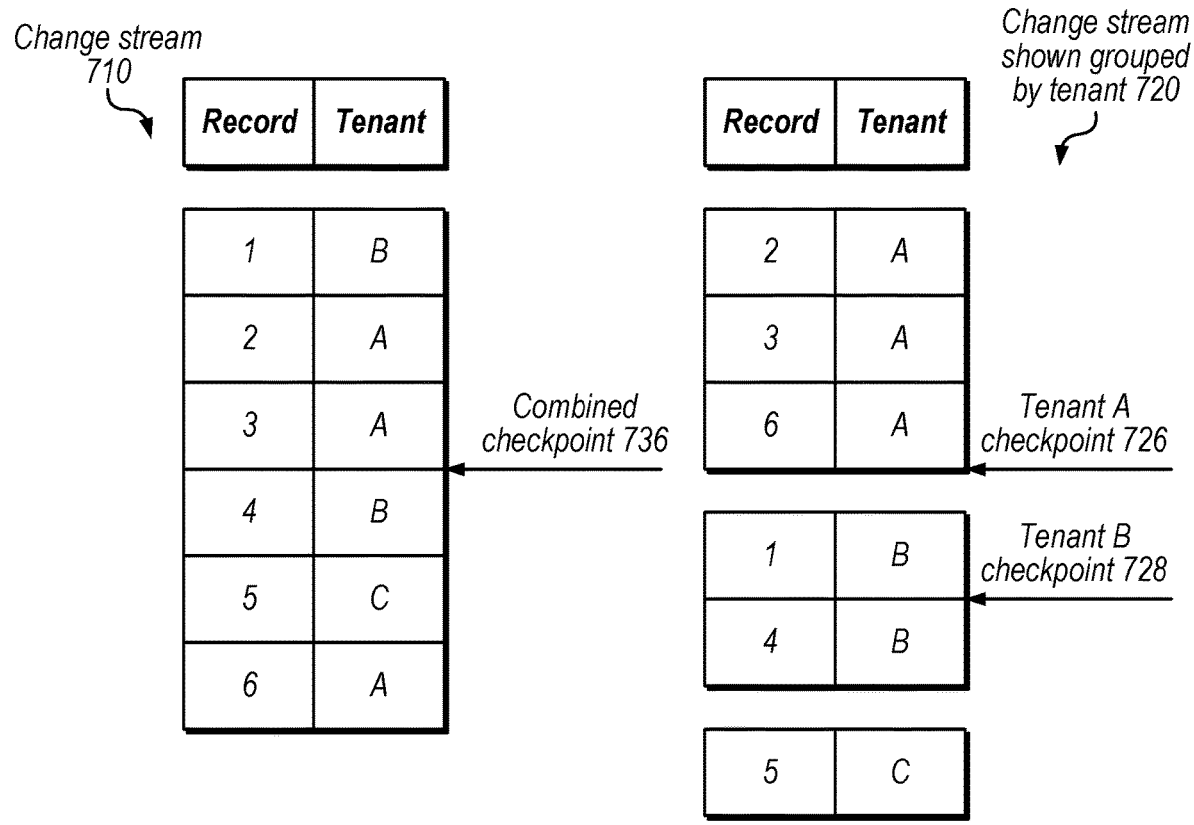
FIG. 7 is a block diagram illustrating techniques for generating a combined change stream checkpoint based on checkpoints from multiple tenants, according to some embodiments.

FIG. 7 is a block diagram illustrating techniques for generating a combined change stream checkpoint based on checkpoints for multiple tenants, according to some embodiments. In the illustrated example, stream process 210 creates a combined checkpoint 736 for a change stream 710 based on individual tenant checkpoints 726 and 728.

Change stream 710, in the illustrated embodiment, includes change records for multiple different tenants. In some embodiments, the numbers associated with change records are sequence numbers (sequence numbers 1-6). In the illustrated embodiment, change stream 710 includes a combine checkpoint 736 that is generated based on individual tenant checkpoints 726 and 728.

The right-hand portion of FIG. 7 shows information 720 which represents the change stream 710 grouped by tenant. In some embodiments, a change processor module 214 is tenant-aware and groups records from a change stream by tenant. Information 720 includes three different groups of records for tenants A, B, and C. In the illustrated embodiment, checkpoints 726 and 728 are shown for tenants A and B, respectively. Note that, within each group of records for a given tenant, a change processor module 214 may maintain the original ordering of records. In some embodiments, one or more change processor modules 214 generate individual tenant checkpoints. Note that the record group for tenant C does not include a checkpoint. For example, the record with sequence number 5 for tenant C may not yet be processed.

In the illustrated embodiment, combined checkpoint 736 is shown after the change record with sequence number 3 in change stream 710. In some embodiments, the combined checkpoint represents the point prior to which all records have been successfully processed. While some sequence numbers after the combined checkpoint 736 may have been successfully processed (e.g., the record for sequence number 6 for tenant A), the combined checkpoint 736 does not advance because other tenants have not yet successfully processed earlier sequence numbers (e.g., tenant B has not processed the record for sequence number 4 and tenant C has not processed the record for sequence number 5).

In some embodiments, stream processor 210 tracks the range of sequence numbers observed for each tenant as well as an individual checkpoint for each tenant (although note that ranges or checkpoints for tenants may be null in certain scenarios). In the example of FIG. 7, stream processor 210 may store the sequence number range [2,6] and a checkpoint indicating sequence number 6 for tenant A. Similarly, stream processor 210 may store range [1,4] and a checkpoint at sequence number 1 for tenant B, and range [5] and a null checkpoint for tenant C.

In some embodiments, stream processor 210 determines a first threshold sequence number for a shared checkpoint based on the lower bounds of ranges for which there is no checkpoint. For example, the first threshold sequence number for the combined checkpoint in the example of FIG. 7 is sequence number 4, because the lower bound for tenant C (which does not have a checkpoint) is 5.

In some embodiments, stream processor 210 also determines a second threshold sequence number based on existing tenant checkpoints. For example, the second threshold sequence number for the combined checkpoint in the example of FIG. 7 is the sequence number 3, because it is the sequence number that comes just before the lowest tenant checkpoint (tenant B's checkpoint before sequence number 4). In some embodiments, stream processor 210 selects the lesser of the first threshold and the second threshold as the shared checkpoint, e.g., sequence number 3 in the example of FIG. 7.

In some embodiments, a stream processor 210 may also support tenant-independent checkpointing modes. In some embodiments, the techniques discussed with reference to FIG. 7 allow accurate checkpointing in the multi-tenant scenario, even when the underlying database is not aware of multi-tenancy.

Example Method

Figure 8:
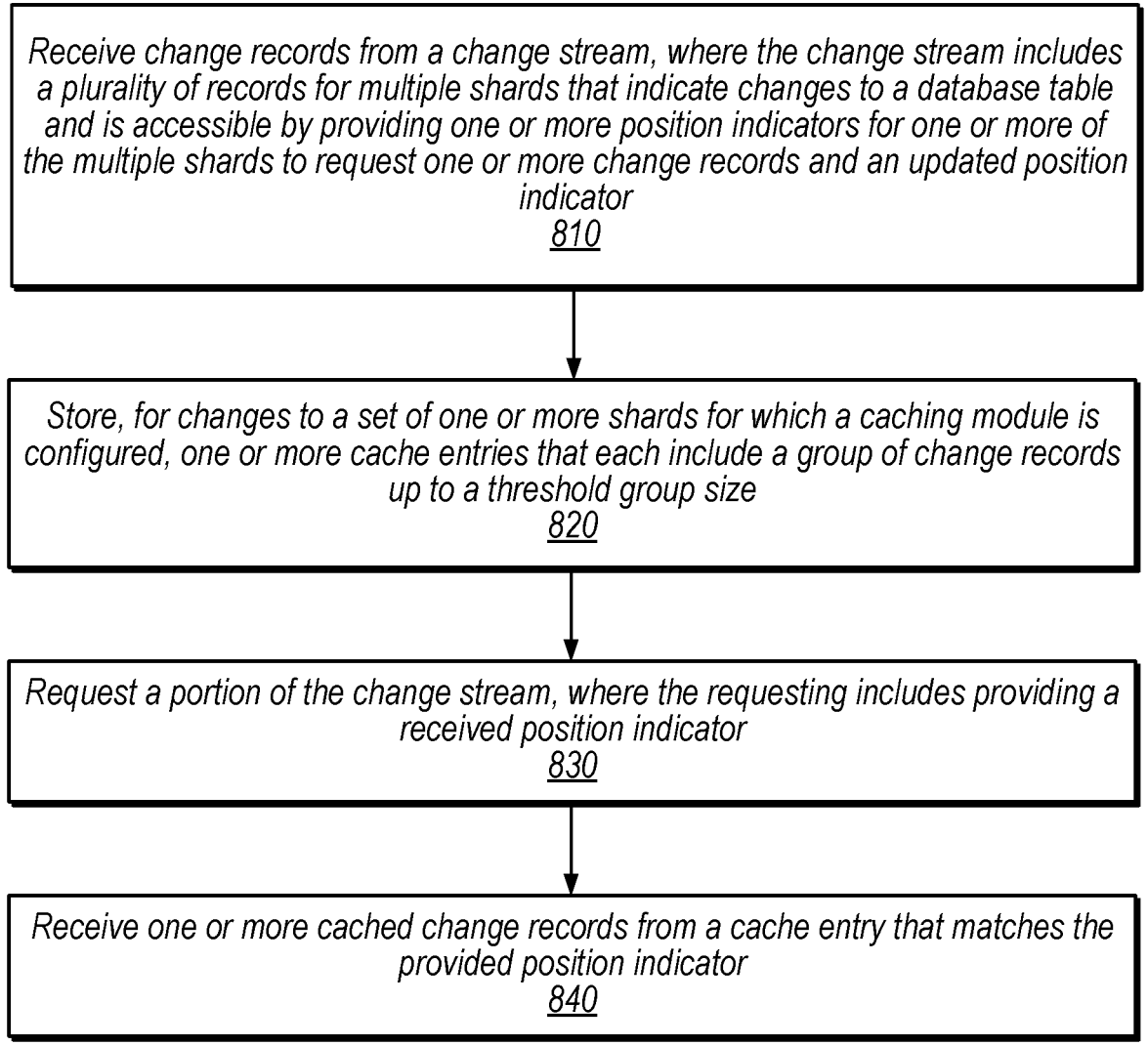
FIG. 8 is a flow diagram illustrating a method for processing a change stream for a database table using a cache, according to some embodiments.

FIG. 8 is a flow diagram illustrating a method for processing a change stream for a database table using a cache, according to some embodiments. The method shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 810, in the illustrated embodiment, a caching module of a computer system receives change records from a change stream, where the change stream includes a plurality of records for multiple shards that indicate changes to a database table and is accessible by providing one or more position indicators for one or more of the multiple shards to request one or more change records and an updated position indicator.

In some embodiments, a multi-tenant adapter receives tenant-based requests from the change processor module and converts the tenant-based requests to requests that are supported by a database system that maintains the database table, where the multi-tenant adapter module uses the database table to store fields for multiple different tenants. In some embodiments, the computer system determines multiple tenant checkpoints based on processing change records for multiple tenants. In some embodiments, the computer system determines a combined checkpoint based on the multiple tenant checkpoints and stores the combined checkpoint.

At 820 the caching module stores, for changes to a set of one or more shards for which the caching module is configured, one or more cache entries that each include a group of change records up to a threshold group size.

At 830 a change processor module of the computer system requests a portion of the change stream, including providing a received position indicator.

In embodiments, the caching module and the change processor module are included in a stream process and the method further comprises accessing the change stream using multiple different stream processes executed by the computer system.

At 840 the change processor module receives, from the caching module, one or more cached change records from a cache entry that matches the provided position indicator. In some embodiments, the match between the cache entry and the provided position indicator is based on a shard identifier and sequence number included in the position indicator, where cache entries include a tag value with one or more shard identifiers and one or more sequence numbers corresponding to the one or more shard identifiers.

In some embodiments, the computer system stores an address for the change processor module in a lease table of a database system in association with one or more shards of the change stream handled by the change processor module, where the database system maintains the database table and the change stream. In some embodiments, the address for the change processor module may be a DNS address of a process that includes the change processor module. In some embodiments, the received position indicator is forwarded by another module based on the stored address.

In some embodiments, a polling module of the computer system polls the change stream using a position indicator, where the position indicator includes shard identifiers for one or more shards in the change stream and a sequence number for each shard. In some embodiments, in response to the polling, the polling module receives one or more new change records and an updated position indicator. In some embodiments, the caching module stores the one or more new change records in one or more cache entries.

Example Computing Device

Figure 9:
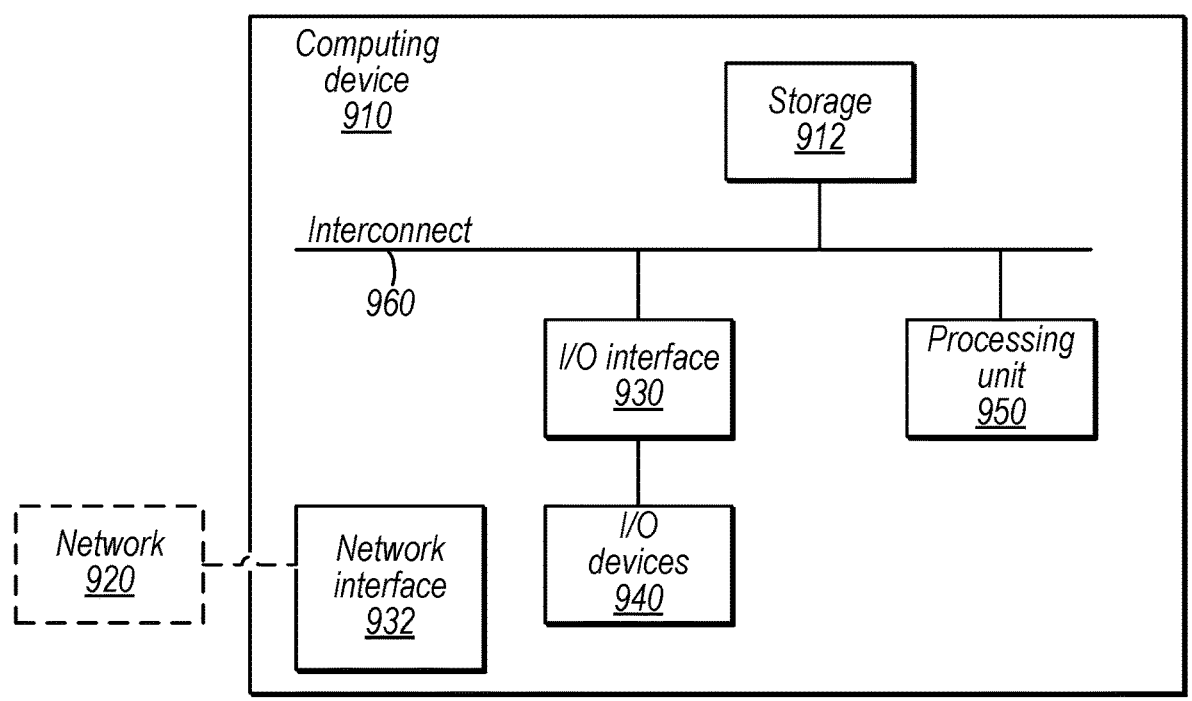
FIG. 9 is a block diagram illustrating an example computing device, according to some embodiments.

Turning now to FIG. 9, a block diagram of a computing device (which may also be referred to as a computing system) 910 is depicted, according to some embodiments. Computing device 910 may be used to implement various portions of this disclosure. Computing device 910 is one example of a device that may be used as a mobile device, a server computer system, a client computer system, or any other computing system implementing portions of this disclosure.

Computing device 910 may be any suitable type of device, including, but not limited to, a personal computer system, desktop computer, laptop or notebook computer, mobile phone, mainframe computer system, web server, workstation, or network computer. As shown, computing device 910 includes processing unit 950, storage subsystem 912, and input/output (I/O) interface 930 coupled via interconnect 960 (e.g., a system bus). I/O interface 930 may be coupled to one or more I/O devices 940. Computing device 910 further includes network interface 932, which may be coupled to network 920 for communications with, for example, other computing devices.

Processing unit 950 includes one or more processors, and in some embodiments, includes one or more coprocessor units. In some embodiments, multiple instances of processing unit 950 may be coupled to interconnect 960. Processing unit 950 (or each processor within processing unit 950) may contain a cache or other form of on-board memory. In some embodiments, processing unit 950 may be implemented as a general-purpose processing unit, and in other embodiments it may be implemented as a special purpose processing unit (e.g., an ASIC). In general, computing device 910 is not limited to any particular type of processing unit or processor subsystem.

As used herein, the terms "processing unit" or "processing element" refer to circuitry configured to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage subsystem 912 is usable by processing unit 950 (e.g., to store instructions executable by and data used by processing unit 950). Storage subsystem 912 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 912 may consist solely of volatile memory in some embodiments. Storage subsystem 912 may store program instructions executable by computing device 910 using processing unit 950, including program instructions executable to cause computing device 910 to implement the various techniques disclosed herein.

I/O interface 930 may represent one or more interfaces and may be any of various types of interfaces configured to couple to and communicate with other devices, according to various embodiments. In some embodiments, I/O interface 930 is a bridge chip from a front-side to one or more back-side buses. I/O interface 930 may be coupled to one or more I/O devices 940 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 9 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a caching module of a computer system, change records from a change stream, wherein the change stream includes a plurality of records that indicate changes to a database table;
   wherein the change stream includes change records for multiple shards and wherein the change stream is accessible by providing one or more position indicators for one or more of the multiple shards to request one or more change records and an updated position indicator;
   storing, by the caching module for changes to a set of one or more shards for which the caching module is configured, one or more cache entries that each include a group of change records up to a threshold group size;
   requesting, by a change processor module of the computer system, a portion of the change stream, wherein the requesting includes providing a received position indicator; and
   receiving, by the change processor module from the caching module, one or more cached change records from a cache entry that matches the provided position indicator.

2. The method of claim 1, further comprising:
   receiving, by a multi-tenant adapter module, tenant-based requests from the change processor module; and
   converting, by the multi-tenant adapter module, the tenant-based requests to requests that are supported by a database system that maintains the database table, wherein the multi-tenant adapter module uses the database table to store fields for multiple different tenants.

3. The method of claim 2, further comprising:
   determining, by the computer system, multiple tenant checkpoints based on processing change records for multiple tenants;
   determining, by the computer system, a combined checkpoint based on the multiple tenant checkpoints; and
   storing the combined checkpoint.

4. The method of claim 1, wherein the caching module and the change processor module are included in a stream process, wherein the method further comprises accessing the change stream using multiple different stream processes executed by the computer system.

5. The method of claim 1, further comprising:
   storing, by the computer system, an address for the change processor module in a lease table of a database system in association with one or more shards of the change stream handled by the change processor module, wherein the database system maintains the database table and the change stream; and wherein the received position indicator is forwarded by another module based on the stored address.

6. The method of claim 1, further comprising:
polling, by a polling module of the computer system, the change stream using a position indicator, wherein the position indicator includes shard identifiers for one or more shards in the change stream and a sequence number for each shard;
receiving, in response to the polling, one or more new change records and an updated position indicator; and
storing, by the caching module, the one or more new change records in one or more cache entries.

7. The method of claim 1, wherein the match between the cache entry and the provided position indicator is based on a shard identifier and sequence number included in the position indicator, and wherein cache entries include a tag value with one or more shard identifiers and one or more sequence numbers corresponding to the one or more shard identifiers.

8. A non-transitory computer-readable medium having instructions stored thereon that are capable of execution by a computing device to perform operations comprising:
receiving, by a caching module, change records from a change stream, wherein the change stream includes a plurality of records that indicate changes to a database table;
wherein the change stream includes change records for multiple shards and wherein the change stream is accessible by providing one or more position indicators for one or more of the multiple shards to request one or more change records and an updated position indicator;
storing, by the caching module for changes to a set of one or more shards for which the caching module is configured, one or more cache entries that each include a group of change records up to a threshold group size;
requesting, by a change processor module, a portion of the change stream, wherein the requesting includes providing a received position indicator; and
receiving, by the change processor module from the caching module, one or more cached change records from a cache entry that matches the provided position indicator.

9. The non-transitory computer-readable medium of claim 8, wherein the operations further comprise:
receiving, by a multi-tenant adapter module, tenant-based requests from the change processor module; and
converting, by the multi-tenant adapter module, the tenant-based requests to requests that are supported by a database system that maintains the database table, wherein the multi-tenant adapter module uses the database table to store fields for multiple different tenants.

10. The non-transitory computer-readable medium of claim 9, wherein the operations further comprise:
determining multiple tenant checkpoints based on processing change records for multiple tenants;
determining a combined checkpoint based on the multiple tenant checkpoints; and
storing the combined checkpoint.

11. The non-transitory computer-readable medium of claim 8, wherein the operations further comprise:
storing an address of the change processor module in a lease table of a database system in association with one or more shards of the change stream handled by the change processor module, wherein the database system maintains the database table and the change stream; and
wherein the received position indicator is forwarded by another module based on the stored address.

12. The non-transitory computer-readable medium of claim 8, wherein the operations further comprise:
polling, by a polling module, the change stream using a position indicator, wherein the position indicator includes shard identifiers for one or more shards in the change stream and a sequence number for each shard;
receiving, in response to the polling, one or more new change records and an updated position indicator; and
storing, by the caching module, the one or more new change records in one or more cache entries.

13. The non-transitory computer-readable medium of claim 8, wherein the match between the cache entry and the provided position indicator is based on a shard identifier and sequence number included in the position indicator, and wherein cache entries include a tag value with one or more shard identifiers and one or more sequence numbers corresponding to the one or more shard identifiers.

14. A system, comprising:
processor circuitry; and
one or more memories having instructions stored thereon that are capable of being executed by the processor circuitry;
wherein at least one of the processor circuitry and the one or more memories implement:
a caching module configured to:
receive change records from a change stream, wherein the change stream includes a plurality of records that indicate changes to a database table;
wherein the change stream includes change records for multiple shards and wherein the change stream is accessible by providing one or more position indicators for one or more of the multiple shards to request one or more change records and an updated position indicator;
store, for changes to a set of one or more shards for which the caching module is configured, one or more cache entries that each include a group of change records up to a threshold group size; and
a change processor module configured to:
request a portion of the change stream, wherein the requesting includes providing a received position indicator; and
receive, from the caching module, one or more cached change records from a cache entry that matches the provided position indicator.

15. The system of claim 14, further comprising:
a multi-tenant adapter module configured to:
receive tenant-based requests from the change processor module; and
convert the tenant-based requests to requests that are supported by a database system that maintains the database table, wherein the multi-tenant adapter module uses the database table to store fields for multiple different tenants.

16. The system of claim 15, wherein the system is further configured to:
determine multiple tenant checkpoints based on processing change records for multiple tenants;
determine a combined checkpoint based on the multiple tenant checkpoints; and
store the combined checkpoint.

17. The system of claim 14, wherein the system is further configured to:
store an address of the change processor module in a lease table of a database system in association with one or more shards of the change stream handled by the change processor module, wherein the database system maintains the database table and the change stream; and wherein the received position indicator is forwarded by another module based on the stored address.

18. The system of claim 14, further comprising:
a polling module configured to:
  poll the change stream using a position indicator, where the position indicator includes shard identifiers for one or more shards in the change stream and a sequence number for each shard; and
  receive, in response to the polling, one or more new change records and an updated position indicator.

19. The system of claim 18, wherein the caching module is further configured to:
store the one or more new change records in one or more cache entries.

20. The system of claim 14, wherein the match between the cache entry and the provided position indicator is based on a shard identifier and sequence number included in the position indicator, and wherein cache entries include a tag value with one or more shard identifiers and one or more sequence numbers corresponding to the one or more shard identifiers.

\* \* \* \* \*